Nov. 9, 1926.
L. HOLLAND-LETZ
1,606,577
TRACTOR
Filed Feb. 6, 1920   9 Sheets-Sheet 6
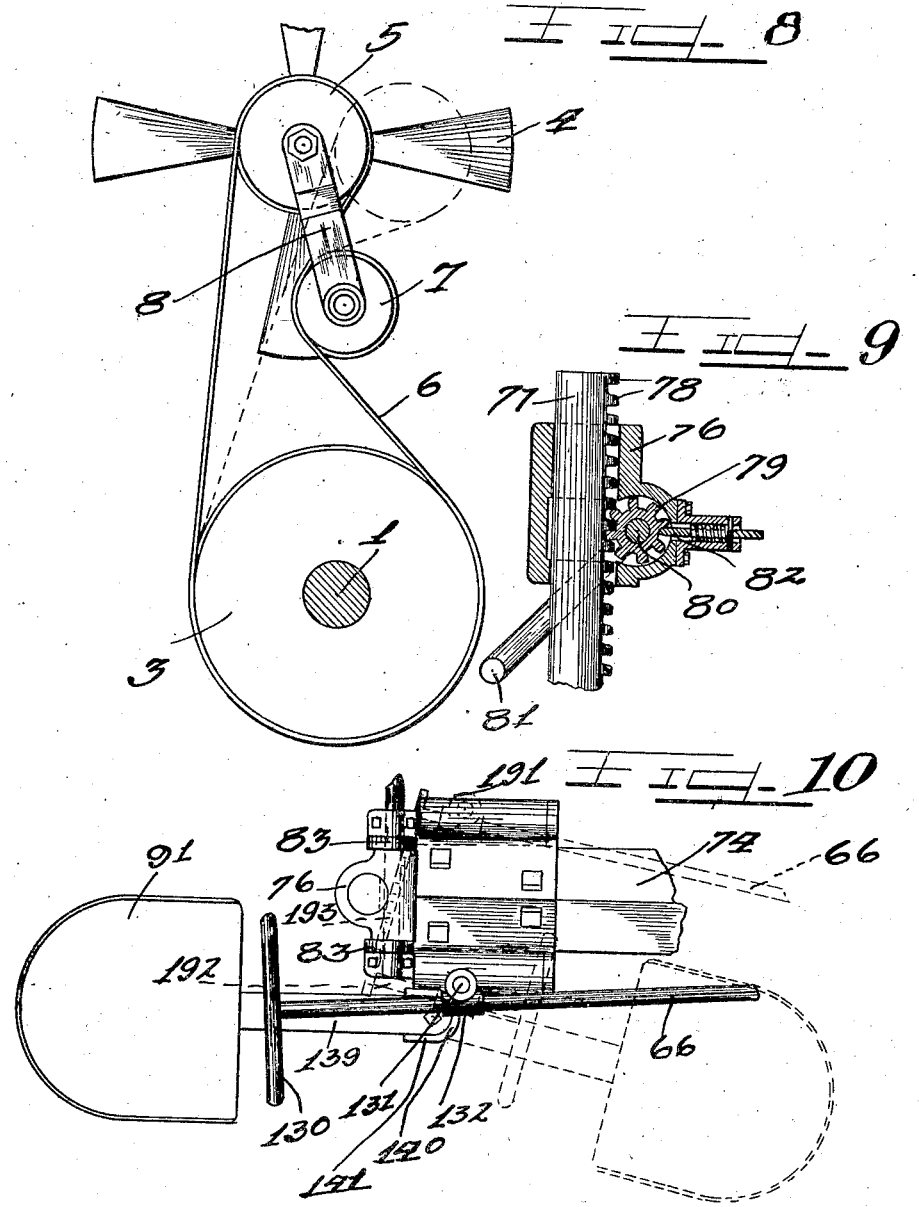

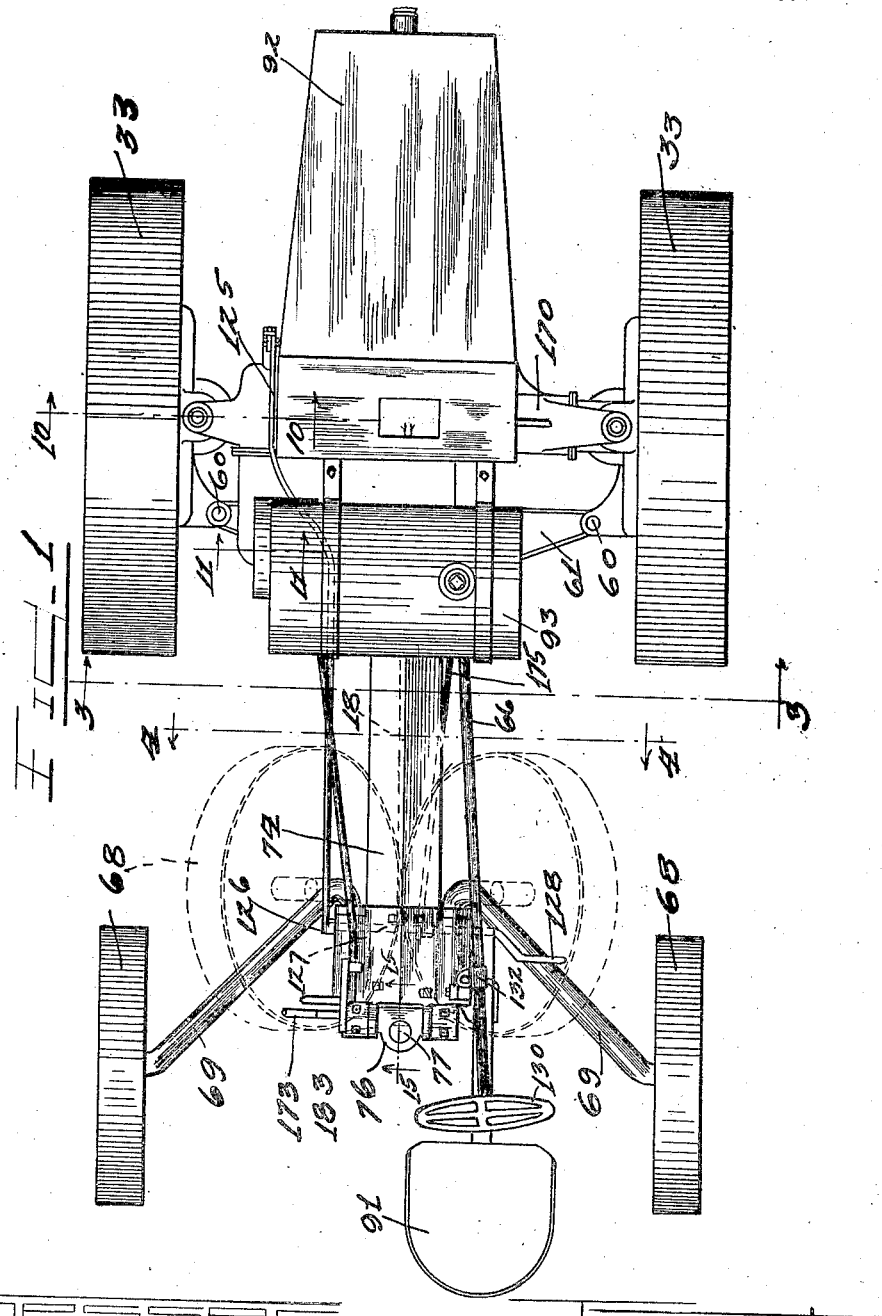

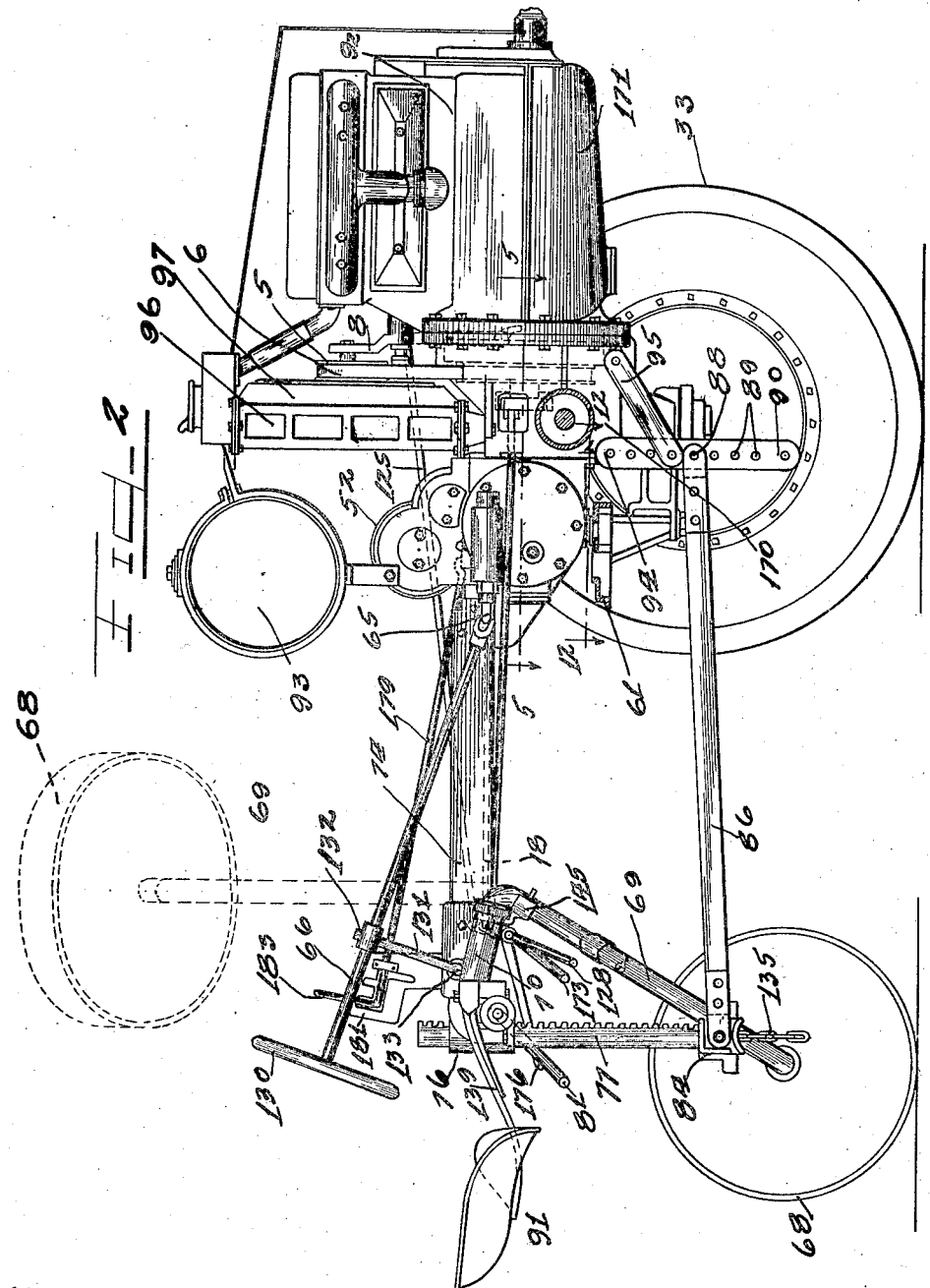

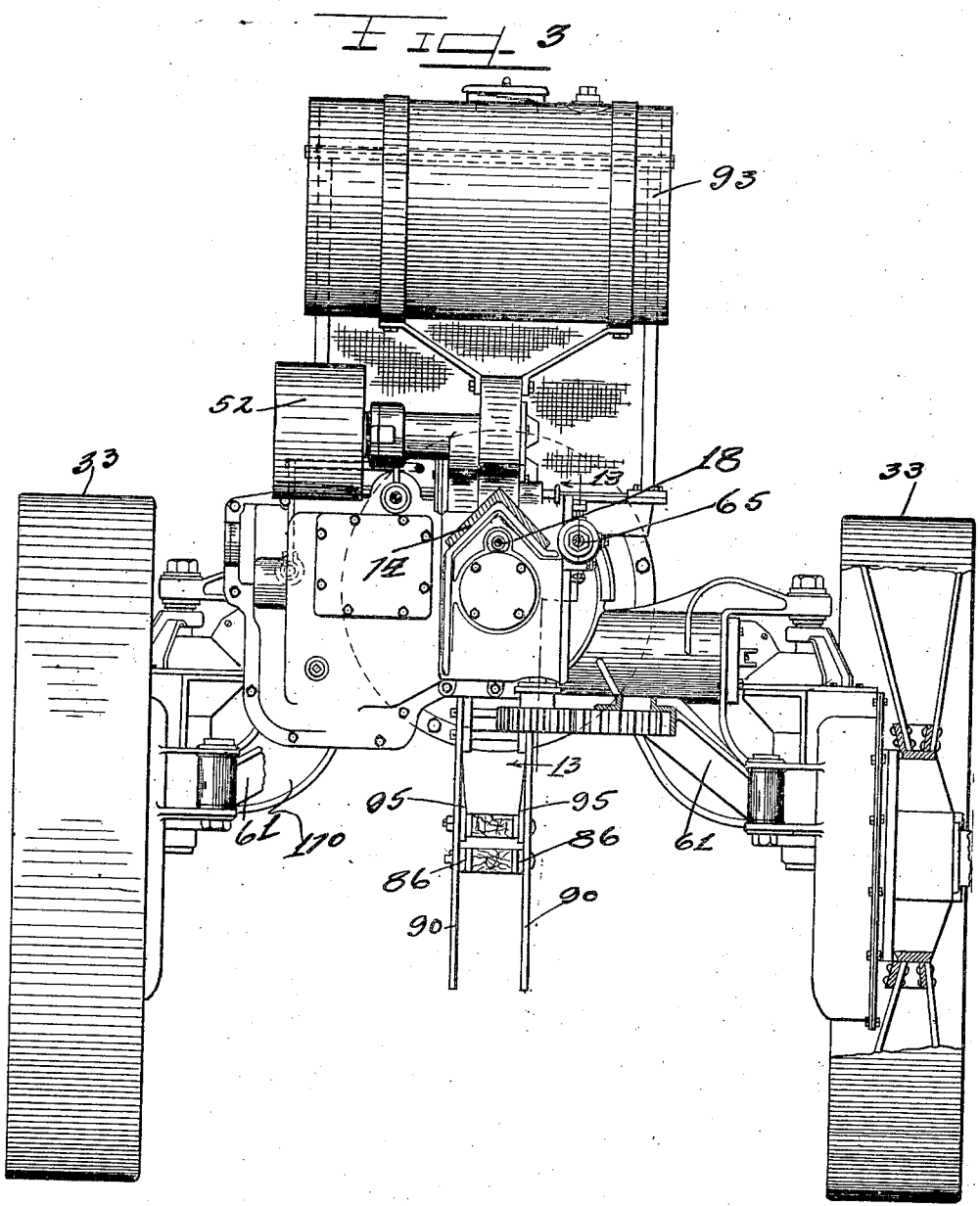

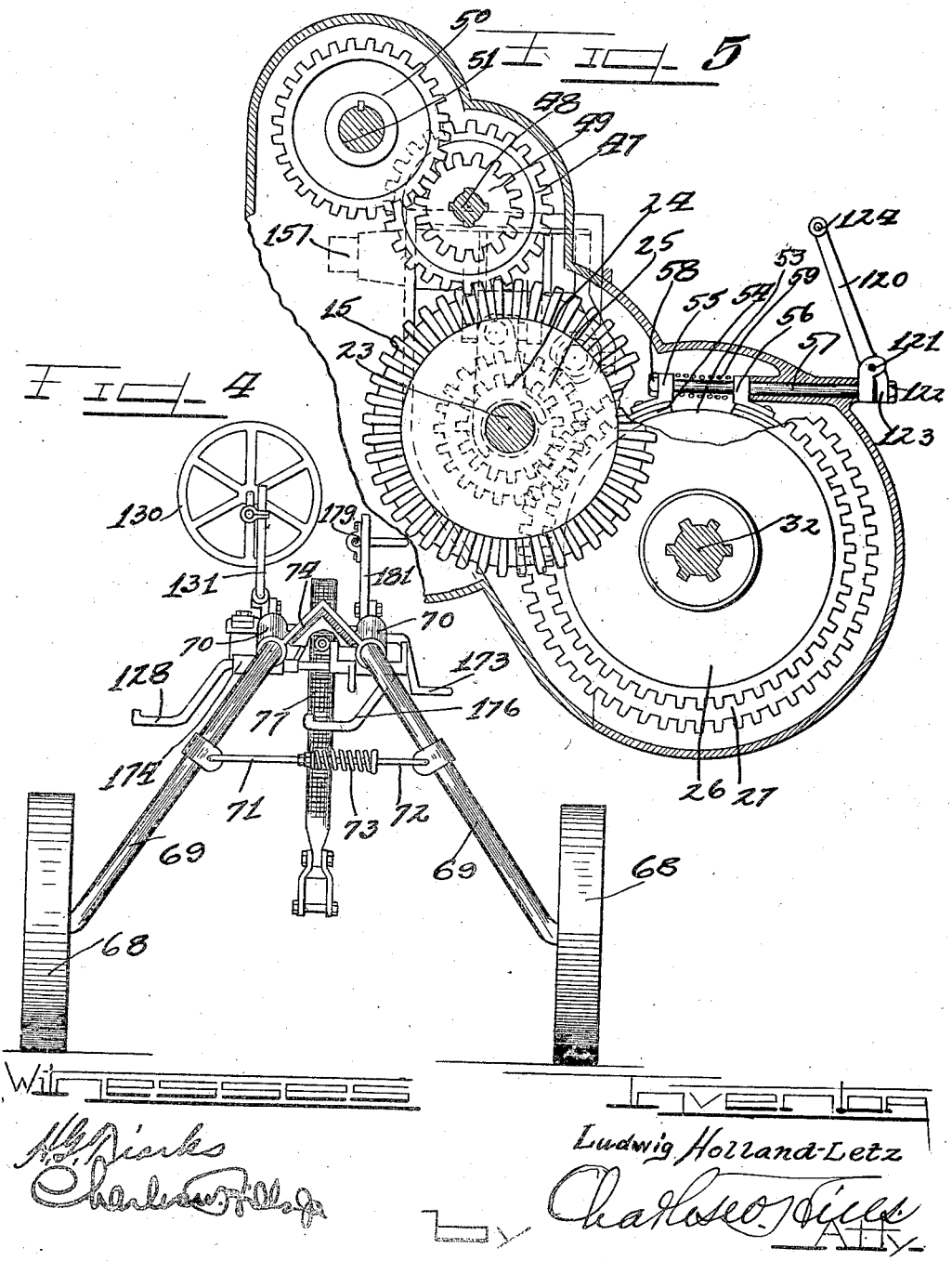

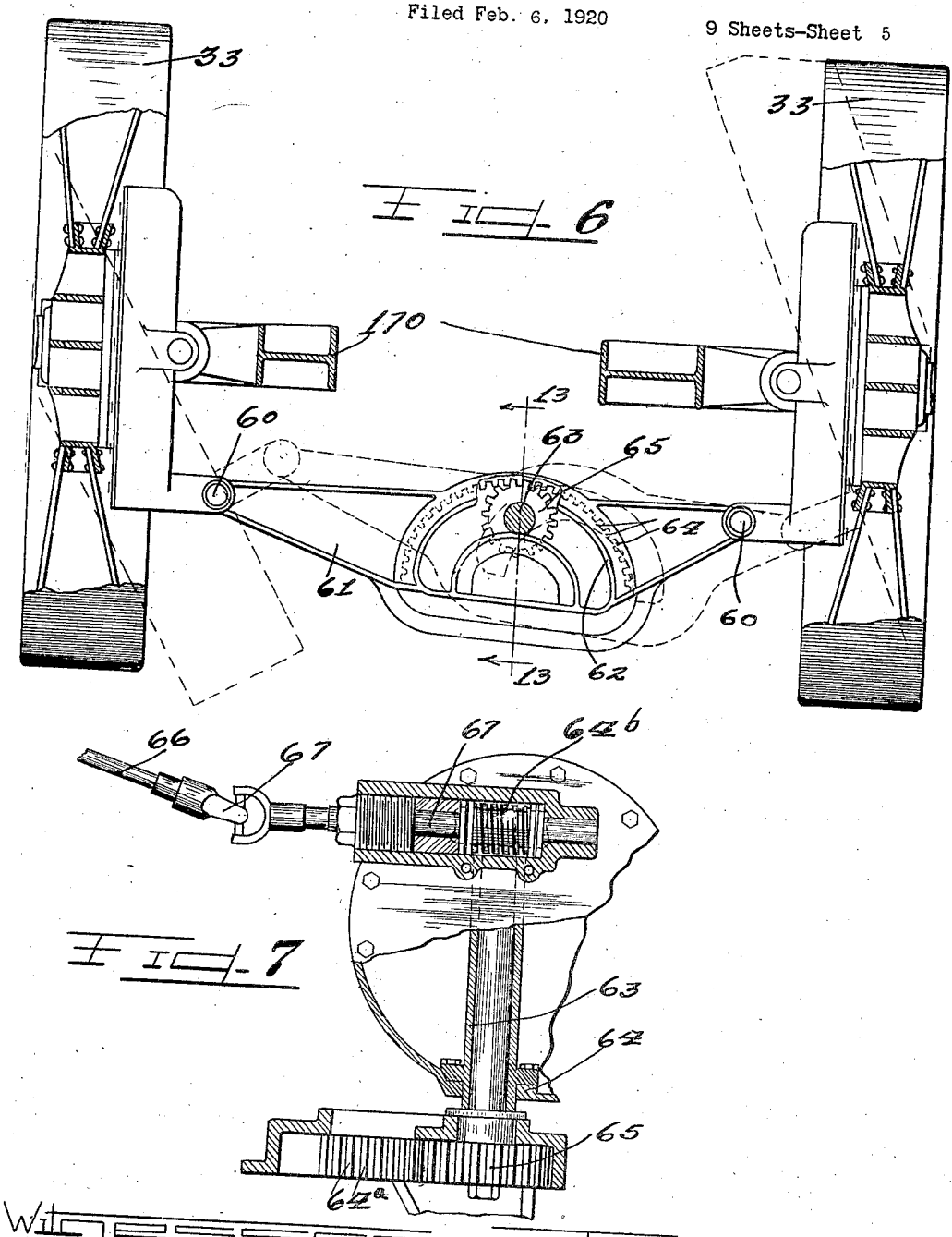

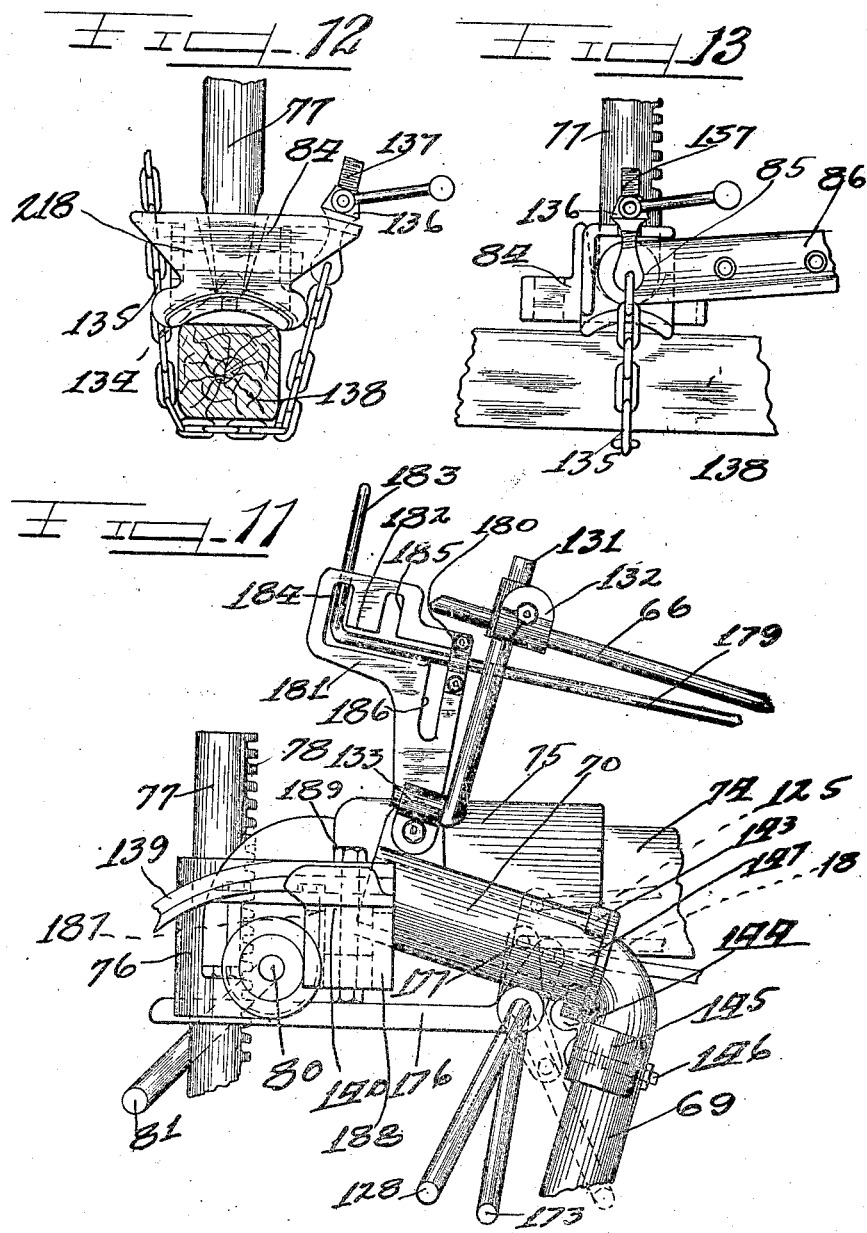

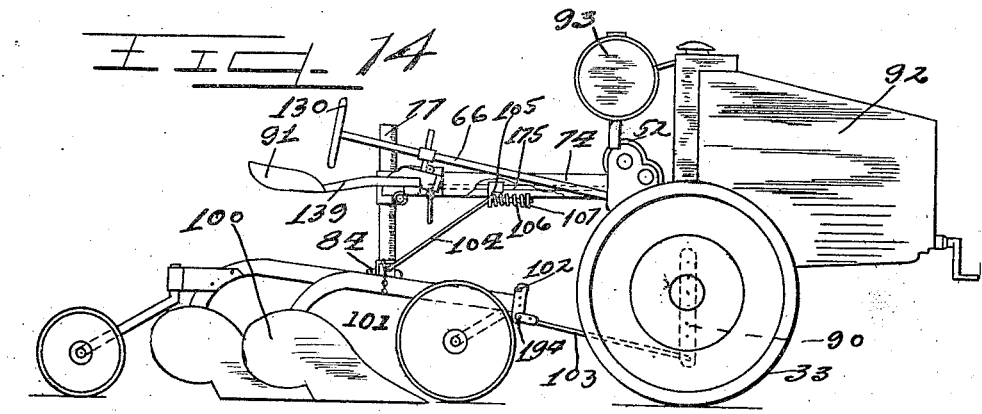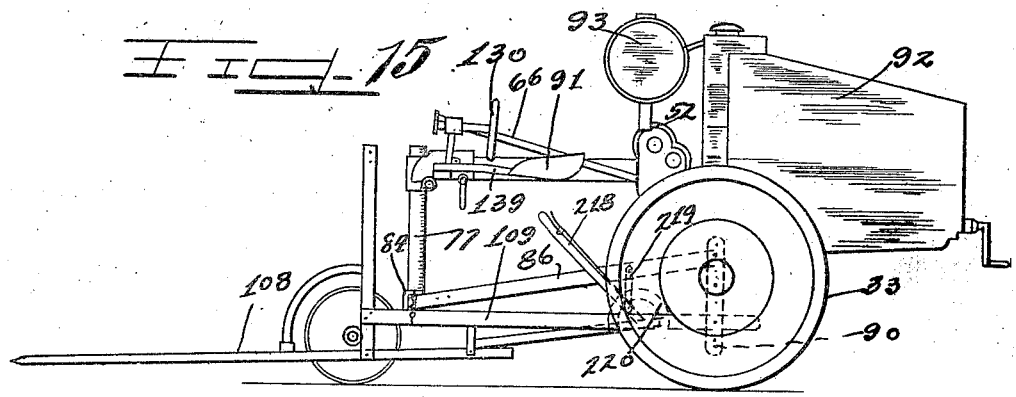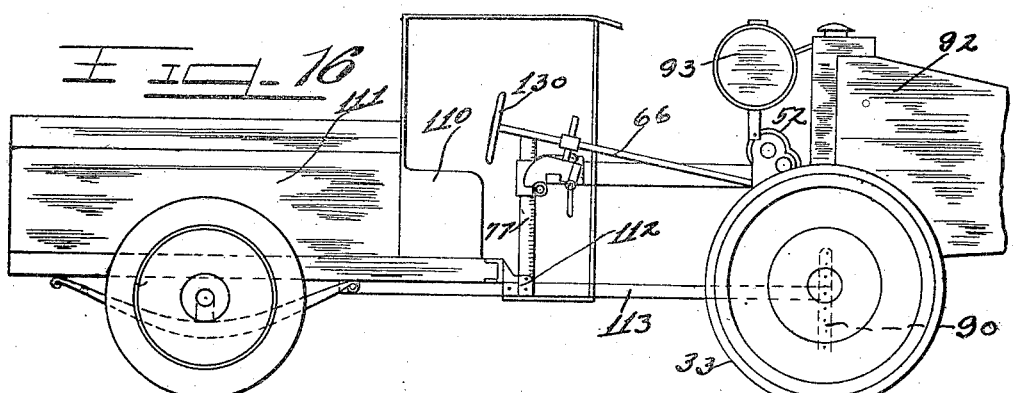

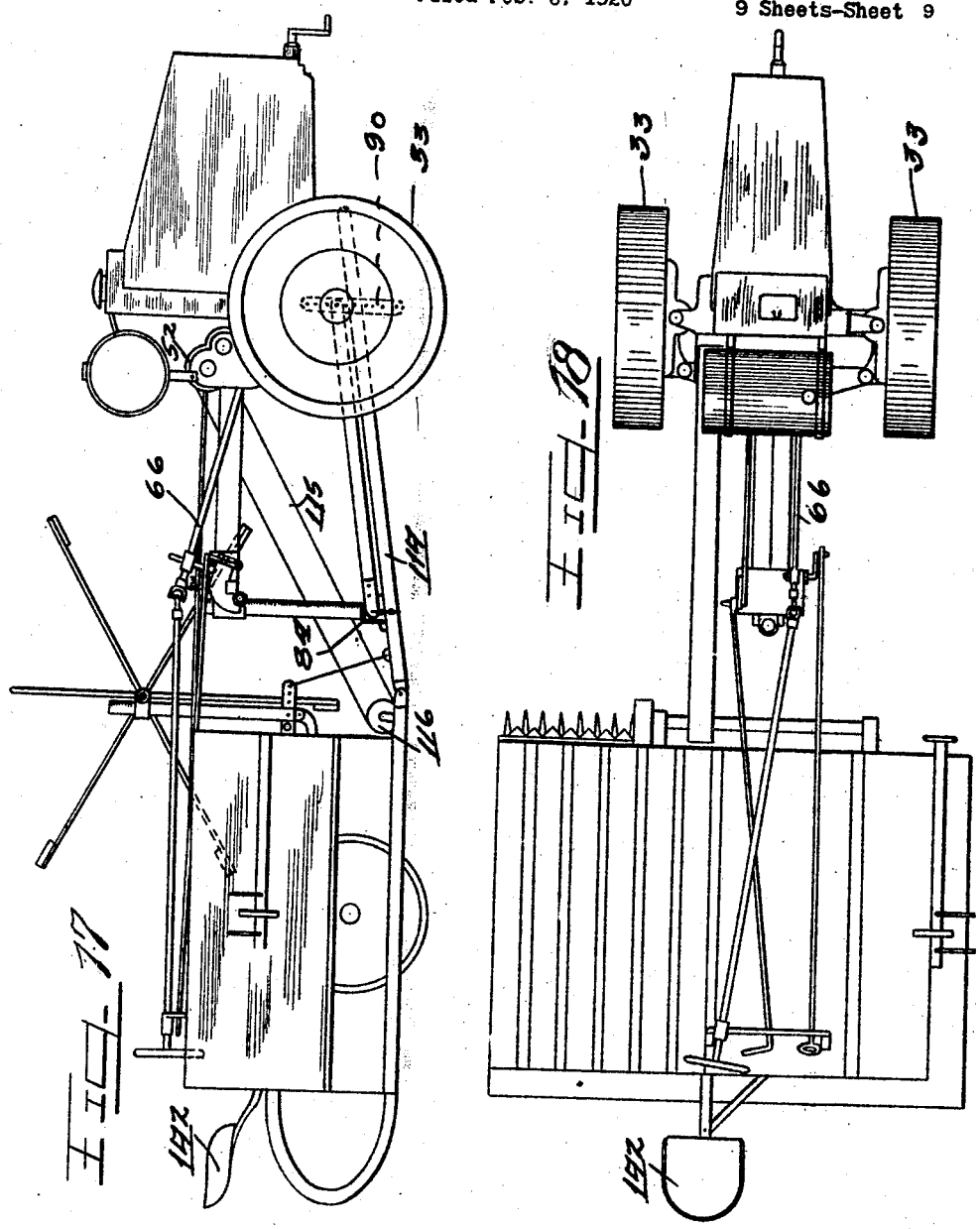

Patented Nov. 9, 1926.

1,606,577

UNITED STATES PATENT OFFICE.

LUDWIG HOLLAND-LETZ, OF OAK PARK, ILLINOIS.

TRACTOR.

Application filed February 6, 1920. Serial No. 356,691.

This invention relates to tractors, self-propelled vehicles, and agricultural machines.

One of the objects of the invention is to provide a tractor which may be readily attached to a wagon, plow, sweep rake or the like or be made a part of an automobile truck.

An additional object of the invention is to provide an improved form of tractor having supporting wheels which may be conveniently and quickly moved into inoperative position or detached to enable the body of the tractor to be attached to a truck body, wagon, sweep rake, plow, reaper, or other agricultural machine.

A further object of the invention is to provide a power plant supported by a pair of steerable traction wheels.

An important object of the invention is to provide a tractor in which practically all of the weight is carried by the traction wheels.

Another object of the invention it to provide a self-propelled vehicle having a pair of traction wheels and a pair of supporting wheels, the frame and power plant being non-resiliently connected to the traction wheels and resiliently connected to the supporting wheels.

A further object of the invention is to provide improved means for transmitting power to the traction wheels.

Another object of the invention is to provide improved steering gear for self-propelled vehicles.

It is also an object of the invention to provide an improved form of spring connection between the frame and the wheels of a vehicle.

A further object of the invention is to provide a simple form of tractor which may be used either to drive stationary machines such as threshers, or draw moving apparatus such as plows, or simultaneously draw and supply power to a machine as in the case of a reaper.

Other and further important objects of this invention will be apparent from the disclosures in the drawings and specification.

The invention (in a preferred form) is illustrated in the drawings and hereinafter more fully described.

On the drawings—

Fig. 1 is a plan view of a tractor.

Fig. 2 is a side view with parts broken away.

Fig. 3 is a section on the line 3—3 of Fig. 1.

Fig. 4 is a section on the line 4—4 of Fig. 5.

Fig. 5 is a sectional view illustrating the brake mechanism and the drive to the power pulley.

Fig. 6 is a section on the line 12—12 of Fig. 2.

Fig. 7 is a section on the line 13—13 of Figs. 3 and 6.

Fig. 8 is a section with parts in elevation illustrating the fan drive and mounting.

Fig. 9 is a section on the line 15—15 of Fig. 1.

Fig. 10 is a plan view on an enlarged scale of the rear end of the tractor frame and the parts mounted thereon.

Fig. 11 is a side elevation on an enlarged scale of the rear end of the tractor frame and the parts mounted thereon.

Fig. 12 is a rear elevation of the clamp to which the drawbar of the plow or the like is attached.

Fig 13 is a side view of the same.

Fig. 14 is a side elevation of the tractor connected to a plow.

Fig. 15 is a side elevation of the tractor connected to a sweep rake.

Fig. 16 is a side elevation of the tractor connected to a truck body.

Fig. 17 is a side elevation of a reaper connected to the tractor.

Fig. 18 is a plan view of the same.

As shown in the drawings—

The tractor comprises a pair of traction wheels 33 adjacent one end and a pair of supporting wheels 68 adjacent its other end. Between the driving wheels is arranged an internal combustion engine 92 which is set forward of the center line of the wheels 33 not only to throw as much of the weight as possible onto the latter but also to facilitate the transmission of power from the engine to the wheels 33. In the rear of the engine is mounted the gasoline tank 93, and between the tank and the engine is located the radiator 96, the fan casing 97, and also the water circulating pump.

With this arrangement the fly-wheel of the engine may be used not only as a part of the friction clutch but also as the pulley for the belt by which the fan and water circulating pump are driven.

The frame comprises a casting 170 forming the lower part of the gear case and carrying the bearings for the traction wheels 33. To the front end of this casting is bolted the crank case 171 of the engine 92 by which the latter is supported. To the rear portion of the casing is bolted a beam 74 of inverted V-shaped section. The supporting wheels 68, driver's seat 91, and other parts are attached to the rear end of this beam.

The main driving shaft 1 of the engine is provided with a fly-wheel 2 and a belt pulley 3 (Fig. 8) formed integrally therewith, from which a fan 4 is driven (Fig. 8) by a belt 6. The fan and its belt pulley 5 are mounted on the free end of an angularly adjustable arm 8, while a pulley 7 bears against one side of the belt 6 so that by adjusting the position of the arm 8, as indicated in dotted lines in Figure 8, the tension of the belt may be regulated. Conveniently the pulley 7 is arranged to drive the water circulating pump of the engine thereby reducing the number of operating parts and producing a very compact arrangement of the power plant.

Since the speed of operation of the tractor necessarily varies with the work to be done, being slower for example when used to draw a plow than when coupled to a wagon, suitable change-speed gear is provided. This may be of any suitable construction and therefore is not specifically described herein.

In addition to driving the wheels the provision is made for driving a belt pulley either independently of the wheels for driving a thresher or the like or simultaneously therewith for operating the parts of a reaper. For this purpose gear teeth are formed around the periphery of the gear 15 for meshing with a gear 47 on a shaft 48. On the same shaft a gear 49 of smaller size is arranged for driving a gear 50 on a shaft 51. On the other end of the shaft 51 to the gear 50 is mounted a pulley wheel 52. The gear 47 is slidably mounted on the shaft 48 to allow it to be brought in and out of engagement with the gear 15.

The tractor is provided with a single brake drum 53 (Fig. 5) secured to the spider 28 of the differential. Around this drum is arranged a brake band 54 (Fig. 6) having apertured lugs 55 and 56 at its ends. A rod 57 passing through an aperture in the casing extends through the apertures in the lugs 55 and 56. By drawing the rod 56 outwards, the nut 58 at its end engaging the lug 55 draws the latter towards the other lug 56 and causes the brake band to bind on the brake drum. A spring 59 on the rod 57 aids the return of the rod 47 and the lug 55 to their original position. For operating the brake a lever 120 is provided pivoted to the frame at 121 and having a forked lower end 123 adapted to straddle the end of the rod 57 and bear against a nut 122 on the end thereof.

It will be evident from the drawings that all of the various controls are conveniently operable from the driver's seat.

For operating the lever 11 a pedal-operated crank 173 is provided journaled in bearings 174 secured to the end of the beam 74. This crank is operatively connected to a rod 175 secured at its other end to the lever 11. By pressure of the foot on the lever 11, the lever 11 may be drawn rearwardly thereby releasing the friction clutch which connects the engine shaft 1 with the transmission shaft 9.

The clutch rod 18 extends rearwardly to a crank 177 operated by a lever 176 (Fig. 11).

The brake lever 120 is connected at 124 to a link 125 (Figs. 1 and 2). The forward end of this link is connected to a crank 126 at one end of a shaft 127 on the other end of which a pedal crank 128 is formed.

One of the difficulties with previous forms of steering gear is that when the steering wheels are turned through a large angle the connecting link between the steering knuckles comes nearly into line with the axis about which one of the wheels is turning with the result that any additional force on the wheel causes the steering knuckle to move to the opposite side of the center line of the link. This is due to the fact that the steering gear provides only for longitudinal movement of the link and when the wheels have turned through a large angle a very small longitudinal movement of the link represents a much larger angular movement of the wheels. This large angular movement of the wheels is, however, accompanied by a large angular movement of the link. Accordingly by simultaneously controlling the angular and longitudinal movements of the link the steering wheels can be controlled satisfactorily through a large angle.

The improved form of steering mechanism is shown more particularly in Figs. 6 and 7. The steering knuckles 60 for each wheel are connected by a frame 61 having centrally formed therein an arcuate opening 62 for the passage of a vertical shaft 63 therethrough. This shaft is journaled in fixed bearings 64 on the frame of the tractor and can therefore not move forward and backward with the frame 61 as the wheels swing. By making the opening 62 arcuate, however, the edges of the opening are always in contact with the shaft 63 as the frame swings to and fro.

Along the outer margin of the opening 62 are formed rack teeth 64ª adapted to mesh with a pinion 65 at the lower end of the shaft 63. With this arrangement by rotating the shaft 63 the frame 61 may be swung from side to side thereby turning the wheels 33. The engagement of the rack 64 and the pinion 65 locks the frame 61 not only against longitudinal but also against angular movement thereby ensuring that the steering wheels are firmly held in adjusted position.

The shaft 63 may be turned by means of a worm-wheel not shown operated by a worm 64ᵇ on a shaft 65. This shaft is connected to a steering rod 66 by a universal joint 67. Adjacent the steering wheel 130, a bracket 131 is provided carrying at its upper end a bearing block 123 to which the steering rod is journaled, while at its lower end it is secured to a part of the tractor frame by a block 133 having a groove for its reception and bolted against a projection on the saddle 75 (Fig. 11).

The rear wheels 68 are each rotatably mounted on the outer ends of round steel bars 69 bent upwardly and then rearwardly with their upper ends journaled in bearings 70 on the tractor frame (Fig. 2). These two bars or bent axles 69 are resiliently connected by links 71 and 72 normally held in closed overlapping relation as shown in Figure 4 by a spring 73, but adapted to separate somewhat under the weight of the tractor and also jars and bumps on the wheels 68.

Each bearing 70 is provided with a flange 143 at its forward end which is engaged by a hook 144 on a member 145 clamped to the axle 69, by a bolt 146 so that the axle may swing in the bearing 70 without becoming disengaged. In order, however, that the axles and wheels may be removed when desired, a portion of the flange 143 is cut away as at 147 so that, after the rods 71 and 72, which normally hold the axles in the position shown in Fig. 4, have been disconnected from each other, the axles may be moved upwardly to bring the hooks 144 into register with cut-away portions 147 of the flanges 143 when the axles may be withdrawn from the bearings 70.

If it is desired to elevate the rear wheels off the ground without detaching them, as for example where the tractor is hitched to a machine in the field and no means are available for carrying the wheels, the wheels may be swung upwardly beyond the position in which they may be detached and then connected together by means of the links 71 and 72. The wheels will then be in the position shown in dotted lines in Fig. 1.

The raising of the rear end of the tractor so that the wheels 68 are clear of the ground may be accomplished by means of a rack-bar 77 passing through a block 76 journaled between rearwardly extending lugs 83 on the saddle 75. With the teeth 78 of this rack-bar meshes a pinion 79. This pinion is mounted on a shaft 80 provided with a crank arm 81 by which it may be rotated. A spring-impelled latch 82 releasably holds the pinion in adjusted position.

On the lower end of the rack-bar 77 is arranged a hitch clamp 84 connected to the ends 85 of a pair of links 86 (Figs. 2 and 13. The other ends 87 of these links are connected to a pair of brackets 90 (Fig. 3) having a series of holes 89 there along through any one of which a bolt 88 may be passed to secure the links thereto. These links 90 are secured at 94 to the frame of the tractor and are braced by a pair of links 95. The draw-bar of the plow etc. hauled by the tractor is connected to these links 90.

The clamp 84 is pivotally attached by a pin 218 to the lower end of the rack-bar 77 to allow it to rock relatively to the latter in a direction longitudinal with respect to the tractor. With this arrangement the rack-bar may swing backward and forward while the lower surface of the hitch clamp maintains a position parallel to the draw-bar to which it is secured. Further, the aperture in the lower part of the rack-bar 77 is flared at each end (see Fig. 12) to allow the clamp to rock laterally through a small angle. The clamp is slotted both laterally and longitudinally on one side to engage one or other of the links of a chain 135 and on the other side to receive a block 136 threaded onto the threaded extension 137 of one of the links of the chain. By rotating the block 136 the chain may be tightened around the draw-bar 138 of the agricultural or other machine connected to the tractor. With this arrangement the chain may be used to secure a beam or other part to the clamp either longitudinally or transversely thereto. In order that the clamp may hold either a longitudinal or transverse beam against lateral movement, the underside of the clamp is cupped or curved in both directions.

It will be seen that the rack bar 77 and its clamp 84 serve the dual purpose of a jack for lifting the rear wheels 68 off the ground and also giving rigidity to the connection between the tractor and an agricultural or other machine, while the tractive force is obtained through the links or brackets 90.

The seat 91 is mounted on the end of a bracket 139 clamped by a bolt 189 to a block 140 rotatably mounted in a projection 188 of the saddle piece 75 (Fig. 11). This block is formed with lateral flanges 141 to prevent the bracket 139 turning relatively thereto. A feather or lug 187 on the underside of the block 140 engages one or other of a plurality of grooves in the upper surface of the projection 188 so that the block is held in the required angular position. When it is desired to change the position of the seat to that indicated in dotted lines in Fig. 10 the seat and the block 140 are lifted and then turned to bring the lug 187 into engagement with another groove in the projection 188.

When the seat is turned so that the tractor may be driven rearwardly, various adjustments are necessary in addition to reversing the position of the seat. In the first place, as will be seen from Fig. 10, the rear end of steering rod 66 must be moved to the opposite side of the beam 74 to be out of the way of the driver. For this purpose and also to bring the steering wheel into convenient position, a second bracket 191 is provided for supporting the steering rod 66 while the bracket 131 which formerly supported it is employed for supporting a stub shaft 192 on which the steering wheel 130 is mounted. A chain 193 connects the steering rod 66 to the shaft 192. By using a chain the rod 66 and shaft 192 rotate in the same direction so that the steering wheel turns with the steering wheels whether the tractor is driven backwards or forwards. When the seat is reversed, the connections of the rods 175, 18, and 125 to their respective pedals are reversed so that the operator may control the friction clutch, the clutches which engage the pinions 12 and 13 and also the brake while sitting in reversed position.

The application of the tractor to various uses is illustrated in Figs. 14 to 18. In Fig. 14 a gang plow 100 is attached to the tractor. In this case the rear wheels 68 of the tractor are detached by removing their axles from the bearings 70 in which their upper ends are normally secured. The draw-bar 101 of the plow is then clamped against the underside of the clamp 84, while its forward end 102 is connected to the depending bars 90 by a link 103.

The point of connection of the drawbar to the bar 90 is determined by the engine torque to be compensated for. The greater the torque the lower the point of connection, and other things being equal the torque varies inversely with the speed so that the point of connection will be lower when the tractor is hauling a plow than when it is hauling a wagon.

Means are preferably provided for disconnecting the engine clutch if the plow should meet a serious obstruction such as a large rock. For this purpose the pin 194, which connects the parts 102 and 103, is made of wood or other readily frangible material so that it will break or shear under a sudden or excessive strain. In other cases a spring latch adapted to release its grip under excessive strains may be used.

A diagonal rod 104 is also provided extending from the clamp 84 through a lug 105 on the clutch rod 175. A spring 106 is arranged on the end of the rod 104 between the lug 105 and a nut 107 at the end of the rod 104 for absorbing shocks in the rod and allowing the latter to be drawn rearwardly without injury thereto or the parts connected therewith. With this arrangement as soon as the pin 194 is broken the plow draws the rod 104 rearwardly and releases the clutch between the engine and transmission shafts.

The gang plow itself is of usual construction and need not be described in detail here.

In Figure 15 the tractor is connected to a sweep rake 108. In this case also the rear wheels 68 are removed with their axles 69. One of the frame members 109 of the rake is clamped to the lower side of the shoe 84, while its forward end extends beyond the links or brackets 90 between which it is free to slide up and down. The rack-bar 77 in this case, however, is rigidly held in place by the links 86 which are connected to the upper end of the brackets 90. The member 109 is provided with a lever 218 pivoted thereto and connected by a link 219 so that by turning the lever on its pivot the sweep rake is caused to turn relatively to the tractor about the point of connection of the clamp 84 to the rack-bar 77 as a pivot. A notched segment 220 is provided for retaining the lever in adjusted position in a well known manner. When the rake is attached, the tractor is driven backwards and hence, so that the driver may still face forward, the seat 91 is swung around and the position of the steering gear reversed.

The tractor may also be employed to form a truck as shown in Fig. 16. In this case not only the wheels 68 and their axles 69 are removed, but also the seat since the driver sits on a seat 110 at the front end of the truck body 111. The clamp 84 is also detached and the lower end of the bar 77 is attached to a bracket 112, through which a draw-bar 113 extends. Lateral braces extending from the sides of the truck diagonally inwards towards the brackets 90 may also be used if desired. The forward end of the drawbar is bolted to the link or bracket 90.

The tractor may also be used for operating harvesting machines, as shown in Figs. 17 and 18. In this case a draw-bar or pole 114 is clamped onto the underside of the clamp 84 and also attached at its forward ends to the link or bracket 90. The operating parts of the harvesting machine are driven from the engine of the tractor through the pulley 52, bolt 115 and pulley 116 on the platform 117 of the machine. This is made easy by the construction provided in which the tractor is rigidly attached to the reaper making the use of flexible transmission shaft or other devices unnecessary.

When a harvesting machine is coupled to the tractor, the operator sits on a seat 142 at the rear of the reaper and consequently extensions of the steering column, and operating shafts are provided. Where the agricultural or other machines are designed especially for use with the improved tractor here described the chain hitch may be dispensed with and an eye may be provided on the draw-bar of such machines adapted to be hingedly connected directly to the end of the rack-bar 77 by means of a bolt, pin, or the like.

I am aware that numerous details of construction may be varied through a wide range without departing from the principles of this invention, and I therefore do not purpose limiting the patent granted otherwise than necessitated by the prior art.

I claim as my invention—

1. A tractor comprising a frame, a pair of traction wheels adjacent one end of the frame, a pair of supporting wheels adjacent the other end of the frame and adapted to be swung out of operative position, a draw-bar connection adjacent the traction wheels, a bar vertically adjustable relatively to the frame between the supporting wheels, means for raising and lowering the said bar, and means for attaching the bar to the draw-bar of the machine operated by the tractor.

2. A tractor comprising a frame, a pair of traction wheels adjacent one end of the frame, a pair of supporting wheels adjacent the other end of the frame, a substantially vertical bar adjustably mounted at the end of the frame adjacent said supporting wheels, means for raising and lowering said bar, and attaching means pivotally connected to the lower end of the bar for attaching the latter to a machine operated by the tractor.

3. A self-propelled vehicle comprising a frame, a power plant mounted thereon, a pair of traction wheels, a pair of supporting wheels swingable on the frame about a transverse horizontal axis thereof, the frame and power plant being non-resiliently connected to the traction wheels and pivotally and resiliently connected to the supporting wheels.

4. A tractor comprising a frame, a pair of traction wheels adjacent one end of the frame, a pair of supporting wheels removably secured to the other end of the frame and adapted to be swung out of operative position, a draw-bar connection, a bar vertically adjustable and oscillatable longitudinally relatively to the frame, means for raising and lowering the said draw-bar, and means for attaching the bottom of the bar to the draw-bar of the machine operated by the tractor.

5. A self-propelled vehicle comprising a frame, a power plant rigidly secured thereto, a pair of steerable driving wheels supporting the frame at one end driven from said power plant, and a pair of pivotally mounted removable supporting wheels swingable about a transverse axis of the frame unconnected to the power plant at the other end of the frame.

6. A tractor comprising a frame, a pair of traction wheels thereon, means for connecting the tractor to an implement to be operated, adjustable means for raising and lowering the frame, lateral bracing means for said adjusting means, and auxiliary supporting wheels on the frame adapted to be swung out of operative position after an implement to be operated has been connected to the tractor.

7. A tractor comprising a frame, a pair of traction wheels adjacent one end of the frame, a pair of supporting wheels adjacent the other end of the frame, a bar vertically adjustable relatively to the frame between the last pair of wheels, means for raising and lowering the said bar, and means for attaching the bottom of the bar to the machine operated by the tractor.

8. A tractor comprising a frame, a pair of traction wheels adjacent one end of the frame, a pair of supporting wheels adjacent the other end of the frame, a draw-bar connection adjacent the traction wheels, a bar vertically slidable relatively to the frame between the supporting wheels, means for raising and lowering the said bar and means for attaching the bottom of the bar to the draw-bar of the machine operated by the tractor.

9. A tractor comprising a frame, a pair of traction wheels adjacent one end of the frame, a pair of supporting wheels adjacent the other end of the frame, a draw-bar connection adjacent the traction wheels, a bar vertically slidable and oscillatable longitudinally relatively to the frame between the supporting wheels, means for raising and lowering the said bar and means for attaching the bottom of the bar to the draw-bar of the machine operated by the tractor.

10. A self-propelled vehicle comprising a pair of supporting wheels, axles therefor inclined upwards toward the center of the vehicle, bearings for pivotally supporting the upper ends of the axles, and a resilient connection between the axles.

11. A tractor comprising a pair of traction wheels, means for swinging the traction wheels to turn the vehicle, a pair of supporting wheels movable as a whole up and down in planes transverse to the tractor, and means for resiliently holding the last-mentioned wheels in elevated or depressed positions.

12. A tractor comprising a pair of traction wheels, means for swinging the driving wheels to turn the vehicle, a pair of supporting wheels movable as a whole up and down in planes transverse to the tractor, and means for resiliently holding the last-mentioned wheels in depressed position.

13. A tractor comprising a pair of traction wheels, means for swinging the traction wheels to turn the vehicle, a pair of supporting wheels movable as a whole up and down in planes transverse to the tractor, and means for resiliently holding the last-mentioned wheels in elevated or depressed positions, said wheels being detachable in position intermediate such elevated and depressed positions.

14. A tractor comprising a frame, a pair of traction wheels adjacent one end of the frame, a pair of supporting wheels adjacent the other end of the frame, a bar vertically adjustable in the frame between the last pair of wheels, means for raising and lowering said bar, and a clamp pivotally connected to the lower end of the bar for attaching the latter to the machine operated by the tractor.

15. A tractor comprising a frame, a pair of traction wheels adjacent one end of the frame, a pair of supporting wheels adjacent the other end of the frame between the last pair of wheels, means for raising and lowering said bar and a clamp pivotally connected to the lower end of the bar for movement thereto longitudinally with respect to the tractor whereby the said bar may be attached to the machine operated by the tractor.

16. A tractor comprising a frame, a pair of traction wheels adjacent one end of the frame, a pair of supporting wheels adjacent the other end of the frame, a bar vertically adjustable in the frame between the last pair of wheels, means for raising and lowering said bar, a clamp, a clamping chain and means for securing the ends of the chains to the sides of the clamp for attaching said bar to the machine operated by the tractor.

17. A tractor comprising a frame, a pair of traction wheels adjacent one end of the frame, a pair of supporting wheels adjacent the other end of the frame, a bar vertically adjustable in the frame between the last pair of wheels, means for raising and lowering said bar, said bar having a transverse aperture in its lower end, a clamp and a pin passing through said clamp and said aperture.

18. A tractor comprising a frame, a pair of traction wheels adjacent one end of the frame, a pair of supporting wheels adjacent the other end of the frame, a bar vertically adjustable in the frame between the last pair of wheels, means for raising and lowering said bar, said bar having a transverse aperture in its lower end, a clamp and a pin passing through said clamp and said aperture, the ends of said aperture being rounded to allow the pin to rock as well as rotate in such aperture.

19. A tractor comprising a frame, a pair of traction wheels adjacent one end of the frame, a pair of supporting wheels adjacent the other end of the frame, a bar vertically adjustable in the frame between the last pair of wheels, means for raising and lowering said bar, and a clamp pivotally connected to the lower end of the bar for movement thereto both transversely and longitudinally with respect to the tractor whereby the said bar may be attached to the machine operated by the tractor.

20. A tractor comprising a frame, a pair of traction wheels adjacent one end of the frame, a pair of supporting wheels adjacent the other end of the frame, a bar vertically adjustable in the frame between the last pair of wheels, means for raising and lowering said bar, and clamp having a concave under surface pivotally connected to the lower end of the bar for attaching the latter to the machine operated by the tractor.

21. A tractor comprising a frame, a pair of traction wheels adjacent one end of the frame, a pair of supporting wheels adjacent the other end of the frame, a bar vertically adjustable in the frame between the last pair of wheels, means for raising and lowering said bar, a clamp having a concave under-surface and connected to the lower end of the bar and means for clamping a draw-bar against such under-surface.

22. A tractor comprising a frame, a pair of traction wheels adjacent one end of the frame, a pair of supporting wheels adjacent the other end of the frame, a bar vertically adjustable in the frame between the last pair of wheels, means for raising and lowering said bar, a clamp having a concave under-surface and connected to the lower end of the bar, a clamping chain and means for securing the ends of the chain to the sides of the clamp for clamping a draw-bar against such under-surface.

In testimony whereof I have hereunto subscribed my name.

LUD. HOLLAND-LETZ.